(12) United States Patent
Inoue et al.

(10) Patent No.: US 6,658,341 B2
(45) Date of Patent: Dec. 2, 2003

(54) CLUTCH TORQUE POINT LEARNING METHOD AND CLUTCH CONTROL METHOD

(75) Inventors: Eiji Inoue, Fujisawa (JP); Takumi Shinojima, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/103,363

(22) Filed: Mar. 21, 2002

(65) Prior Publication Data
US 2002/0183912 A1 Dec. 5, 2002

(30) Foreign Application Priority Data

Mar. 23, 2001 (JP) ............................ 2001-085303
Mar. 23, 2001 (JP) ............................ 2001-085304
Mar. 28, 2001 (JP) ............................ 2001-093252

(51) Int. Cl.$^7$ ................................ G06F 7/00
(52) U.S. Cl. ..................... 701/67; 701/59; 477/120; 192/85 R
(58) Field of Search ...................... 701/67, 59; 477/120, 477/143; 192/85 R

(56) References Cited

U.S. PATENT DOCUMENTS

| | | | |
|---|---|---|---|
| 4,388,987 A | 6/1983 | Hennessey et al. | 192/3.26 |
| 4,836,057 A | 6/1989 | Asayama et al. | 477/120 |
| 5,082,097 A | 1/1992 | Goeckner et al. | 477/180 |
| 5,509,867 A * | 4/1996 | Genise | 477/120 |
| 5,601,172 A | 2/1997 | Kale et al. | 192/85 R |
| 5,634,867 A * | 6/1997 | Mack | 477/86 |
| 5,738,609 A * | 4/1998 | Jones et al. | 477/175 |
| 6,022,295 A | 2/2000 | Liu | 477/180 |

FOREIGN PATENT DOCUMENTS

| | | |
|---|---|---|
| EP | 1 002 687 A2 | 5/2000 |
| JP | 11-236931 | 8/1999 |
| JP | 2000-266159 | 9/2000 |

* cited by examiner

*Primary Examiner*—Marthe Y. Marc-Coleman
(74) *Attorney, Agent, or Firm*—McCormick, Paulding & Huber LLP

(57) ABSTRACT

The present invention aims to enable the accurate learning of a true torque point in a wet friction clutch (3), prevent the clutch connection shock by absorbing the response delay upon an ordinary clutch connection control, and to successfully combine the time lag and shock. In the present invention, the value (D) itself of the duty ratio of the duty pulse output from the ECU (16) is learned as the torque point (Dm). In a power transmission device of a vehicle having a fluid coupling (2) and the wet friction clutch (3) provided in series between the engine (E) and transmission (T/M), the value (Dm) of the duty ratio at the time when the clutch input side revolution (Nt) decreases to a value lower than the engine revolution (Ne) by a prescribed revolution (Nm) during the process of gradually connecting the clutch 3 is learned as the torque point. Preferably, learning is conducted after the elapse of a prescribed waiting time ($\Delta$t1). During an ordinary clutch connection control, a prescribed start duty (Dst0) for connecting the clutch (3) broadly up to a point close to the torque point (Dtb) is initially output from the ECU (16), and a gradual duty (Dk) is output after retaining such start duty (Dst0) for a prescribed time ($\Delta$t3). Preferably, a first gradual duty (Dk1) for gradually connecting the clutch quickly is output, and a second gradual duty (Dk2) for gradually connecting the clutch slowly is output thereafter.

13 Claims, 9 Drawing Sheets

CLUTCH TORQUE POINT LEARNING METHOD AND CLUTCH CONTROL METHOD

BACKGROUND OF THE INVENTION

1. Field of the Invention

The present invention generally relates to a torque point learning method and control method of a clutch, and particularly to a torque point learning method and control method of a wet friction clutch provided to the power transmission of vehicles.

This application is entitled to the benefit of and incorporates by reference essential subject matter disclosed in Japanese Patent Application No. 2001-085303 filed Mar. 23, 2001 and Japanese Patent Application No. 2001-085304 filed Mar. 23, 2001 and Japanese Patent Application No. 2001-093252 filed Mar. 28, 2001.

2. Description of the Related Art

In a power transmission device of vehicles, there are those which serially provide a fluid coupling (including a torque converter) and a wet friction clutch in the middle of a power transmission path from the engine to the transmission, and automatically disconnect/connect the wet friction clutch during a gear shift. Here, if a gear-in operation is made when the vehicle is not in motion, the clutch is thereafter automatically connected, and a creep is generated thereby. This point is similar to an ordinary AT vehicle.

Connection of the clutch will generate a clutch connection shock (so-called garage shock, etc.) when too fast, and much time will be required from the gear-in operation to the creep generation when too slow, and the driver will not know when to step on the acceleration (large time lag). Thus, in order to seek the successful combination of such clutch connection shock and shortened connection time, a control is performed so as to rapidly connect the clutch in the allowance region up to when the clutch begins to connect, and to slowly connect the clutch by switching the connection speed once the clutch begins to connect.

More specifically, the working fluid pressure for driving the disconnection/connection of the clutch is altered in accordance with the duty pulse output from the electronic control unit (ECU), and, when connecting the clutch from a disconnected state, a prescribed start duty is foremost output from the electronic control unit such that the clutch will be broadly connected up to a position near where the clutch begins to connect (this is referred to as a single connection), and a gradual connection duty is thereafter output from the electronic control unit in prescribed time intervals for gradually connecting the clutch.

The aforementioned control is an open control, and the ECU outputs a duty pulse pursuant to a predetermined prescribed program.

As shown with the broken lines in FIG. 11, the clutch connection control of the prior inventions foremost outputs from the ECU a prescribed start duty Dst' so as to broadly connect the clutch up to a position near where the clutch begins to connect (this is referred to as a single connection control), thereafter outputs from the ECU in prescribed time intervals a prescribed gradual connection duty Dk' so as to gradually connect the clutch, and, when reaching a prescribed gradual connection end duty Ded', outputs a complete connection duty Dc' (=0%) such that the clutch is completely connected.

The position where the clutch begins to connect; that is, the torque transmission starting point capable of initially transmitting a prescribed torque, is referred to as a torque point, and this torque point is used, for example, as a connection speed switching point by making the control unit learn such point, and a torque point plays an important role in the clutch control. The torque point is made a learning value because clutches have variations or individual differences caused by manufacturing errors or the like, and the torque point differs for each clutch.

Meanwhile, with respect to torque point learning, conventionally, in a dry friction clutch, a clutch stroke value for transmitting a prescribed torque was initially detected, and such value was learned as the torque point.

Nevertheless, in the case of a dry friction clutch, since the clutch plate is constantly sliding in the oil and the torque transmission is achieved with the clutch piston pressing the plates together, the concept of stroke does not exit in the first place. Moreover, although the clutch piston will make a stroke, the stroke length is small (approximately 2 mm for example). Therefore, it is not possible to adopt the method of detecting the clutch piston stroke and making this the learning value as with a dry [friction clutch.

Further, with a wet friction clutch, also considered may be a method of detecting the hydraulic pressure applied to the clutch piston. Nonetheless, a hydraulic sensor is expensive, and the detection of hydraulic pressure is difficult from a structural perspective. In addition, not only is there a problem with respect to the reliability of the detected value itself due to the large hydraulic pulse, there is also the problem in that individual variations exist since the same torque is not necessarily transmitted to the same hydraulic pressure value. Thus, this method may not be adopted either.

On the other hand, with respect to the clutch control and torque point learning, the following problems arise if the gradual connection duty output is commenced immediately after the start duty output. In other words, although the fluid pressure of the clutch piston chamber will rapidly rise pursuant to the output of the start duty, the clutch piston commences the pressing of the clutch plates after a small stroke (approximately 2 mm) of the initial allowance is made. The response will therefore be delayed for the stroke portion, and, when commencing the output of the gradual connection duty immediately after the output of the start duty, the response delay of such deviance will be carried over into the gradual connection. Since similar control is performed during the torque point learning, there is a problem in that the value of the connection side is learned rather than the true torque point of the clutch upon such learning. Moreover, there is an additional problem of the clutch connection shock becoming large upon employing the learning value deviating toward the connection side and due to the aforementioned response delay during the clutch connection control.

Meanwhile, as shown in FIG. 11, with respect to the clutch control, in reality, the torque point may vary due to disturbances such as individual differences, operational conditions, change in properties with time or the like of the clutch, and the optimum start duty value may vary or deviate as illustrated with Dst1' and Dst2'. Moreover, it is not possible to detect such variance or deviation prior to renewing the torque point learning. Therefore, in this case also, if control is performed with the start duty value remaining at Dst', the connection time lag will become large when deviating to Dst1', and the connection shock will become large when deviating to Dst2'.

The following explanation is made with particular reference to the state upon starting the vehicle. FIG. 13 represents the state of the creep change when the gear-in operated is made (when the so-called garage shift is made) immediately before the vehicle is put into motion, and also illustrates changes in the revolution of the input side (pump) and output side (turbine) of the fluid coupling. Revolution of the input side of the fluid coupling may be replaced with engine revolution Ne (solid line), and the revolution of the input side of the fluid coupling, or the turbine revolution Nt (chain line), may be replaced with the clutch input side revolution as is.

At time t0, let it be assumed that the gear-in operation has been completed and that the clutch connection control has been commenced. Since the output side of the clutch is being stopped with a brake from the drive wheel side, the fluid coupling slides more in accordance with the connection of the clutch, and while the pump, which is the input side of the fluid coupling, revolves at a prescribed idle revolution equivalent to the engine revolution Ne, the turbine revolution Nt gradually decreases. The creep gradually increases thereby.

If the decrease of the turbine revolution Nt at the time of an appropriate start duty is line diagram J, when the appropriate value deviates to Dst1' as shown in FIG. 11, the turbine revolution Nt becomes as illustrated with line diagram J1, and the time lag becomes large as a result thereof. Contrarily, when the appropriate value deviates to Dst2' as shown in FIG. 11, the turbine revolution Nt becomes as illustrated in line diagram J2, and the connection shock becomes large as a result thereof.

SUMMARY OF THE INVENTION

The present invention was devised in view of the foregoing problems. An object of the present invention is to enable torque point learning in a wet friction clutch.

Another object of the present invention is to absorb the response delay during clutch connection, enable the accurate learning of a true torque point at the time of learning the torque point, and prevent a large clutch connection shock upon a standard clutch connection control.

A further object of the present invention is to yield redundancy and successfully combine the time lag and shock at the time of clutch connection even in cases where the optimum start duty value varies or deviates pursuant to disturbances.

The torque point learning method of a clutch according to the present invention is a method of learning a torque point of a clutch in a power transmission device of a vehicle in which a wet friction clutch is provided in the middle of a power transmission path extending from the engine up to the transmission, so that the disconnection/connection state of the wet friction clutch is controlled in accordance with the duty ratio of the duty pulse output from an electronic control unit, wherein, when the aforementioned electronic control unit is caused to learn a torque point at which a prescribed torque is transmitted initially while the wet friction clutch is being connected from the disconnected state thereof, the value of the duty ratio of the duty pulse output from the electronic control unit is learned as the torque point.

Moreover, the torque point learning method of a clutch according to the present invention is a method of learning a torque point of a clutch in a power transmission device of a vehicle in which a fluid coupling at the upstream side and a wet friction clutch at the downstream side are provided in series in the middle of a power transmission path extending from the engine up to the transmission; a hydraulic supplying device is provided for supplying a working fluid pressure to the wet friction clutch; and the hydraulic pressure supplied from the aforementioned hydraulic supplying device is changed in accordance with the duty ratio of the duty pulse output from an electronic control unit, for thereby controlling the disconnection/connection state of the wet friction clutch, wherein, when the aforementioned electronic control unit is caused to learn a torque point at which a prescribed torque is transmitted initially while the wet friction clutch is being connected from the disconnected state thereof, the aforementioned duty ratio is changed, while detecting the revolution of the input side of the wet friction clutch and the revolution of the engine, for gradually connecting the wet friction clutch from the disconnected state thereof, and, when the revolution of the input side of the wet friction clutch becomes less than the aforementioned engine revolution by a prescribed value of revolution during the foregoing process, the value of the aforementioned duty ratio at this time is learned as the torque point.

Further, the torque point learning method of a clutch according to the present invention is a method of learning a torque point of a clutch in a power transmission device of a vehicle in which a fluid coupling at the upstream side and a wet friction clutch at the downstream side are provided in series in the middle of a power transmission path extending from the engine up to the transmission; a hydraulic supplying device is provided for supplying a working fluid pressure to the wet friction clutch; and the hydraulic pressure supplied from the aforementioned hydraulic supplying device is changed in accordance with the duty ratio of the duty pulse output from an electronic control unit, for thereby controlling the disconnection/connection state of the wet friction clutch, wherein, when the electronic control unit is caused to learn a torque point at which a prescribed torque is transmitted initially while the wet friction clutch is being connected from the disconnected state thereof, the aforementioned duty ratio is changed, while detecting the revolution of the engine, for gradually connecting the wet friction clutch from the disconnected state thereof, and, when the revolution of the engine has dropped by a prescribed revolution during the foregoing process, the value of the aforementioned duty ratio at this time is learned as the torque point.

Moreover, the torque point learning method of a clutch according to the present invention is a method in a power transmission device of a vehicle which serially provides a fluid coupling at the upstream side and a wet friction clutch at the downstream side, respectively, in the middle of the power transmission path from the engine up to the transmission; provides a hydraulic supplying device for supplying a working fluid pressure to the wet friction clutch; alters the hydraulic pressure supplied from the hydraulic supplying device in accordance with the duty ratio of the duty pulse output from an electronic control unit; and controls the disconnection/connection state of the wet friction clutch thereby, comprising the steps of:

respectively detecting the revolution of the input side of the wet friction clutch and the revolution of the engine; gradually disconnecting the wet friction clutch from a connected state by altering the duty ratio; and, when the difference between the revolution of the input side of the wet friction clutch and the engine revolution becomes less than a prescribed revolution during the foregoing process, learning the duty ratio at such time as the torque point upon making the electronic control unit initially learn the torque point for transmitting a prescribed torque when the wet friction clutch is connected from a disconnected state.

Here, it is preferable that the starting condition of the aforementioned torque point learning includes the conditions of a stopped vehicle, parking brake in use, foot brake in use, and transmission in use. The present invention is also a clutch control method for controlling the disconnection/connection of a clutch by altering the working fluid pressure for driving the disconnection/connection of a wet friction clutch in accordance with the duty pulse output from the electronic control unit, comprising the steps of:

outputting, from the electronic control unit, a prescribed start duty such that the clutch is initially connected broadly up to a point close to the torque point, when connecting the clutch from a disconnected state;

then outputting, from the electronic control unit in prescribed time intervals, such a prescribed gradual connection duty as to gradually connect the clutch;

retaining the start duty after the start duty is output; and commencing the output of the aforementioned gradual connection duty after a predetermined time longer than the aforementioned prescribed time elapses.

Further, the present invention is also A method of learning a torque point of a clutch in a power transmission device of a vehicle in which a fluid coupling and a wet friction clutch are provided in series in the middle of a power transmission path extending from the engine up to the transmission, so that the disconnection/connection state of the clutch is controlled by changing the working fluid pressure for controlling the disconnection/connection of the clutch in accordance with the duty ratio of the duty pulse output from an electronic control unit, comprising the steps of:

when the aforementioned electronic control unit is caused to learn a torque point at which a prescribed torque is transmitted initially while the wet friction clutch is being connected from the disconnected state thereof, detecting the revolution of the input side of the clutch and the revolution of the engine, respectively;

initially outputting, from the electronic control unit, a start duty such that the clutch is connected broadly up to a point close the torque point;

then outputting, from the electronic control unit, a prescribed gradual connection duty in prescribed time intervals such that the clutch is connected gradually;

retaining the start duty after the aforementioned start duty is output, and commencing the output of the aforementioned gradual connection duty after a predetermined time longer than the aforementioned prescribed time elapses; and when the revolution of the input side of the clutch becomes less than the engine revolution by a prescribed value of revolution during the foregoing process, learning the duty ratio at this time as the torque point.

Here, it is preferable that the learning is conducted after a predetermined time that is longer than the aforementioned prescribed time elapses from the time the decrease in the aforementioned prescribed revolution is detected.

The present invention is also a clutch control method for controlling the disconnection/connection of a clutch by altering the working fluid pressure for driving the disconnection/connection of a wet friction clutch in accordance with the duty pulse output from the electronic control unit, wherein, when the clutch is connected from the disconnected state thereof, a start duty is first output from the electronic control unit, the aforementioned start duty being predetermined such that the clutch is connected broadly up to a point close to the torque point and the generation of excess clutch connection shock is constantly avoided in consideration of variances of the torque point;

a first gradual connection duty is then output from the electronic control unit in prescribed time intervals so as to gradually connect the clutch; and a second gradual duty is output from the electronic control unit in prescribed time intervals such that the clutch is gradually connected slowly from the time a prescribed condition is satisfied.

Here, it is preferable that the wet friction clutch is provided in series with a fluid coupling in the middle of a power transmission path extending from the engine up to the transmission in a vehicle, and the aforementioned prescribed condition is established when the difference between the engine revolution and the clutch input side revolution exceeds a prescribed value.

DESCRIPTION OF THE PREFERRED EMBODIMENTS

The preferred embodiments of the present invention are now described with reference to the attached drawings.

Figure 1:
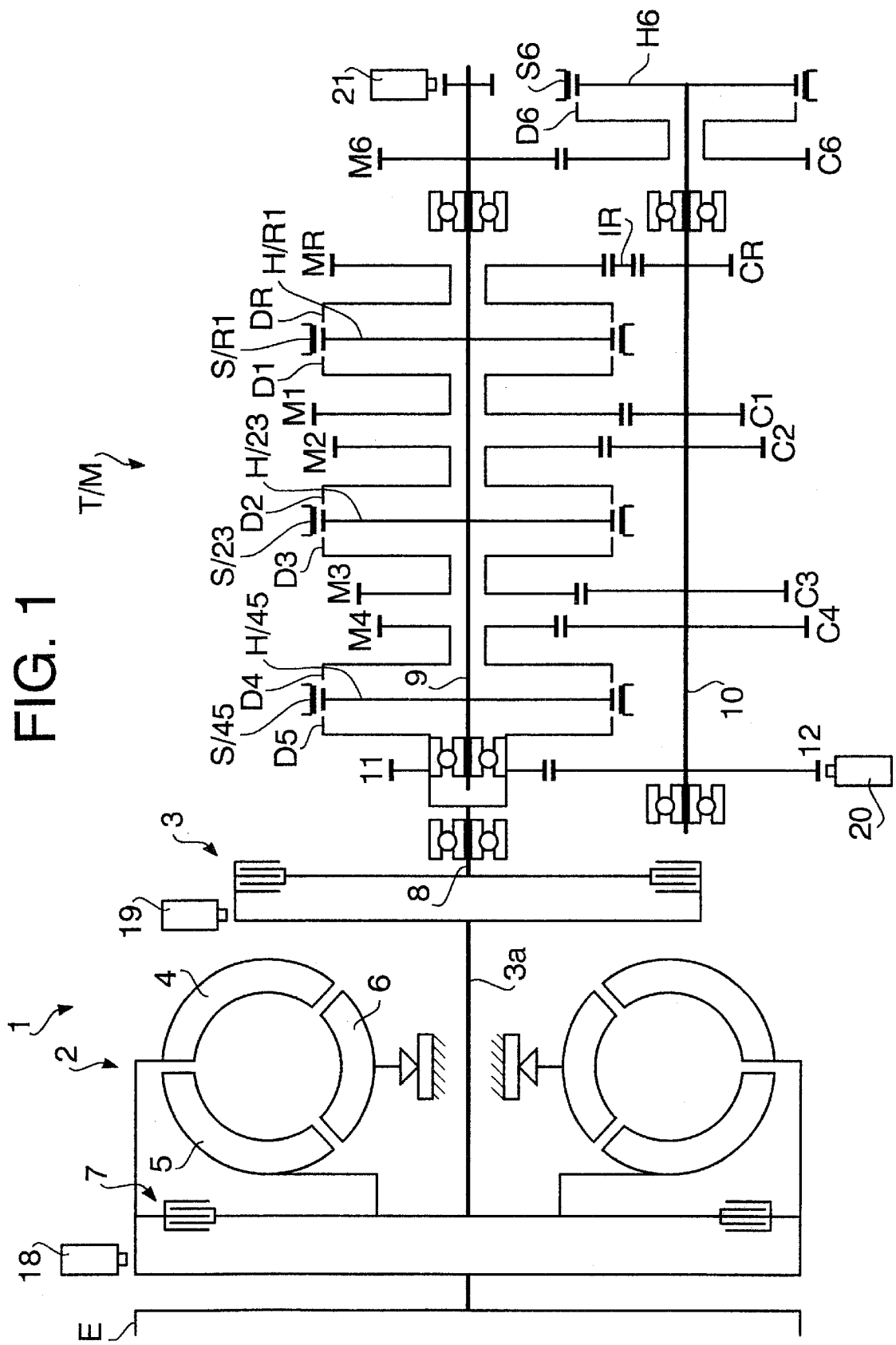
FIG. 1 is a skeleton diagram showing the power transmission device of a vehicle according to an embodiment of the present invention.

FIG. 1 shows a power transmission device of a vehicle in the present embodiment. As illustrated therein, a transmission T/M is connected to an engine E via a clutch mechanism 1. The clutch mechanism 1 is formed of a fluid coupling 2 and a wet multiplate clutch 3. The fluid coupling 2 is provided upstream in the middle of the power transmission path from the engine E up to the transmission T/M, and the wet multiplate clutch 3 is serially provided at the downstream thereof. The fluid coupling as used herein is of a broad concept and includes a torque converter, and, for instance, a torque converter is employed in the present embodiment.

The fluid coupling 2 comprises a pump 4 connected to the output shaft (crank shaft) of the engine; a turbine 5 facing the pump 4 and connected to the input side of the clutch 3; a starter 6 disposed between the turbine 5 and the pump 4; and a lockup clutch 7 for performing the engagement/disengagement with the pump 4 and the turbine 5. With respect to the wet multiplate clutch 3, the input side thereof is connected to the turbine 5 via the input shaft 3a, and the output side thereof is connected to the input shaft 8 of the transmission T/M, thereby enabling the disconnection/connection between the fluid coupling 2 and the transmission T/M.

The transmission T/M comprises an input shaft 8, an output shaft 9 disposed coaxially thereto, and a sub shaft 10 disposed parallel to the foregoing shafts. The input shaft 8 is provided with an input main gear 11. The output shaft 9 axially supports a first main gear M1, a second main gear M2, a third main gear M3, a fourth main gear M4 and a reverse main gear MR, respectively, and a sixth main gear M6 is fixed thereto. Fixed to the sub shaft 10 are an input sub gear 12 for engaging with the input main gear 11, a first sub gear C1 for engaging with the first main gear M1, a second sub gear C2 for engaging with the second main gear M2, a third sub gear C3 for engaging with the third main gear M3, a fourth sub gear C4 for engaging with the fourth main gear M4, and a reverse sub gear CR for engaging with the reverse main gear MR via an idle gear IR, and a sixth sub gear C6 for engaging with the sixth main gear M6 is also axially supported thereby.

According to this transmission T/M, when spline engaging the sleeve S/R1, which as been spline engaged with the hub H/R1 fixed to the output shaft 9, with the dog DR of the reverse main gear MR, the output shaft 9 revolves in reverse, and, when the aforementioned sleeve S/R1 is spline engaged with the dog D1 of the first main gear M1, the output shaft 9 revolves in correspondence with the first gear. And, when spline engaging the sleeve S/23, which as been spline engaged with the hub H/23 fixed to the output shaft 9, with the dog D2 of the second main gear M2, the output shaft 9 revolves in correspondence with the second gear, and, when the aforementioned sleeve S/23 is spline engaged with the dog D3 of the third main gear M3, the output shaft 9 revolves in correspondence with the third gear.

Further, when spline engaging the sleeve S/45, which as been spline engaged with the hub H/45 fixed to the output shaft 9, with the dog D4 of the fourth main gear M4, the output shaft 9 revolves in correspondence with the fourth gear, and, when the aforementioned sleeve S/45 is spline engaged with the dog D5 of the fifth main gear M5, the output shaft 9 revolves in correspondence (directly) with the fifth gear. And, when spline engaging the sleeve S/6, which as been spline engaged with the hub H/6 fixed to the sub shaft 10, with the dog D6 of the sixth sub gear C6, the output shaft 9 revolves in correspondence with the sixth gear. Each of the foregoing sleeves is manually operated with a shift lever in the driver's cab via a shift fork and shift rod not shown.

Figure 2:
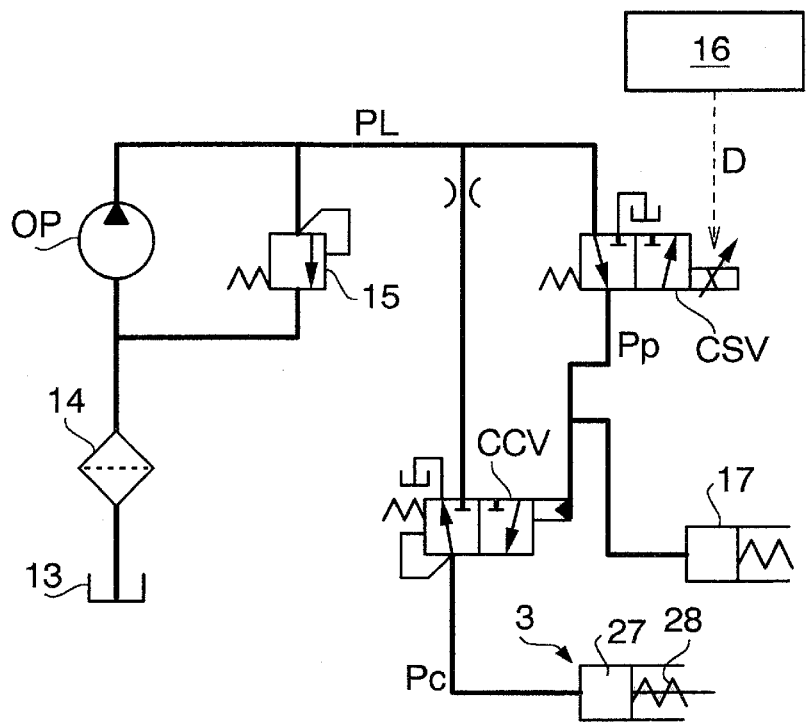
FIG. 2 is a hydraulic circuit diagram showing the hydraulic supplying device according to an embodiment of the present invention.

The wet multiplate clutch 3 is of an ordinary structure. In other words, although not illustrated in the diagrams, a plurality of clutch plates are mutually spline engaged at the input side and output side within the clutch casing filled with oil, and the connection/disconnection of the clutch is performed by pressing together, or releasing, these clutch plates with the clutch piston. With reference to FIG. 2, the clutch piston 27 is constantly urged toward the disconnection side by the clutch spring 28, and the clutch 3 is connected when a hydraulic pressure exceeding such urge is applied to the clutch piston 27. The clutch connection power or the torque capacity of the clutch will increase in accordance with the applied hydraulic pressure.

Next, described is the hydraulic supplying device for supplying a working hydraulic pressure to the wet multiplate clutch 3. As shown in FIG. 2, the oil in the oil tank 13 is aspired and discharged by the hydraulic pump OP via a filter 14, and the discharge pressure thereof is adjusted with a relief valve 15 in order to create a stable line pressure PL. The oil of this line pressure PL is sent to the clutch 3 by performing pressure (depressurization) control, and two valves; namely, a clutch control valve CCV and a clutch solenoid valve CSV, are used therefor. In other words, a pilot operated hydraulic control system is adopted where the clutch control valve CCV connected to the main hydraulic line is opened/closed in accordance with the piloted hydraulic pressure Pp set from the clutch solenoid valve CSV. And, the size of the piloted hydraulic pressure Pp is altered in accordance with the duty ratio (or duty) D of the duty pulse output from the electronic control unit (hereinafter referred to as ECU) 16.

That is, the clutch solenoid valve CSV is an electromagnetic valve having an electromagnetic solenoid, and, in addition to being capable of opening/closing continuously, the line pressure PL is constantly supplied thereto. This [clutch solenoid valve CSV] further receives the duty pulse output from the ECU 16, and opens the value in an amount corresponding to the duty ratio D thereof. The clutch solenoid valve CSV is thereby able to output the piloted hydraulic pressure Pp in accordance with the duty ratio D.

The clutch control valve CCV is a spool valve capable of being opened/closed continuously based on the piloted hydraulic pressure Pp, and this in itself is not electronically controlled. In other words, the internal spool is stroked to the opening side in accordance with the size of the piloted hydraulic pressure Pp, and the line pressure PL is suitably adjusted thereby and sent to the clutch 3 as the clutch pressure Pc. As a result of the above, the hydraulic pressure supplied to the clutch 3 is duty controlled by the ECU 16.

Moreover, an accumulator 17 is provided in the middle of the path connecting the clutch solenoid valve CSV and the clutch control valve CCV.

Figure 3:
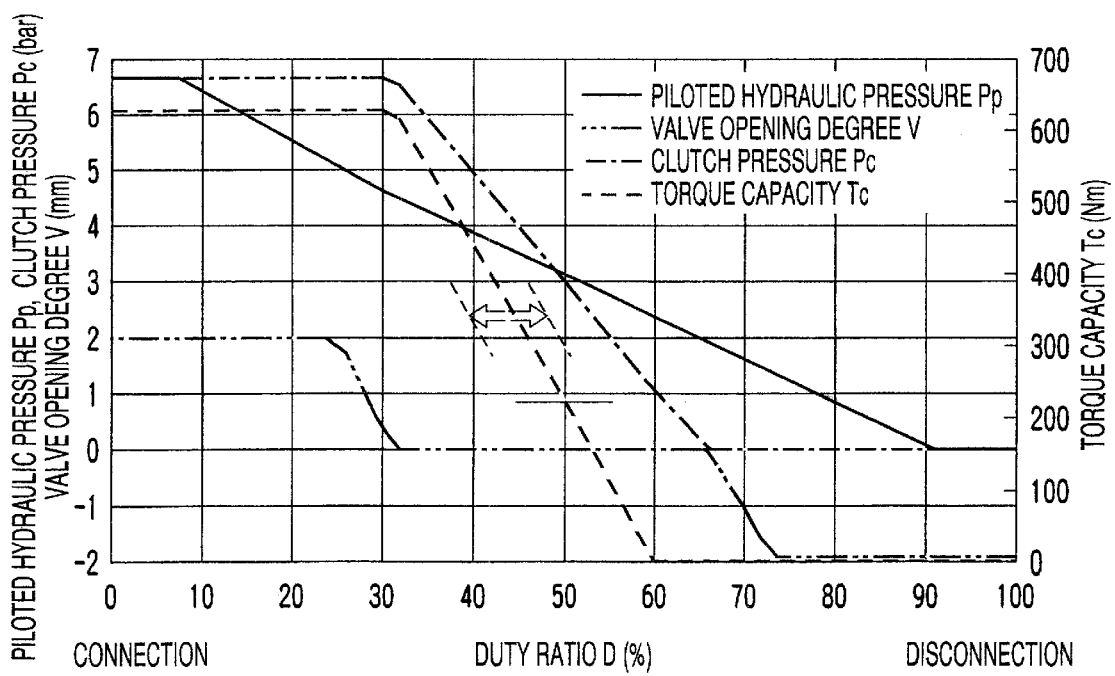
FIG. 3 is a characteristic line diagram of a hydraulic supplying device according to an embodiment of the present invention.

FIG. 3 shows a characteristic line diagram of the hydraulic supplying device. The horizontal axis represents the duty ratio D of the duty pulse output from the ECU 16, and, more particularly is the on-duty ratio showing the ratio of the solenoid on-time in the prescribed control cycle (20 msec in the present embodiment). In the present embodiment, the clutch is completely connected when the duty ratio D is 0(%). This in order to maintain the motion of the vehicle by preserving the connected state of the clutch even in cases where no electricity is provided to the clutch solenoid valve CSV (state of the so-called off stack) due to malfunctions of the electrical system or the like.

As shown in FIG. 3, larger the duty ratio D, larger the connection, and smaller the duty ratio D, smaller the connection. This diagram depicts a tendency where smaller the value of the duty ratio D becomes, the value of the piloted hydraulic pressure Pp output from the clutch control valve CCV increases proportionately, and the hydraulic pressure; that is, the clutch pressure Pc, supplied to the clutch and the torque capacity Tc of the clutch 3 increase proportionately. Moreover, although the valve opening degree V of the clutch control valve CCV is in three positions in the diagram, in reality, the spool valve will make a small stroke when opened fully or in the intermediate opening other than fully closed (valve opening degree of 0 mm), and the clutch pressure Pc may be continuously changed thereby.

Although the control system of a lockup clutch 7 also exists in the present embodiment, the explanation thereof is omitted since it does not directly related to the present invention. The structure of the hydraulic control system thereof is approximately the same as the hydraulic control system of the wet multiplate clutch 3.

Figure 4:
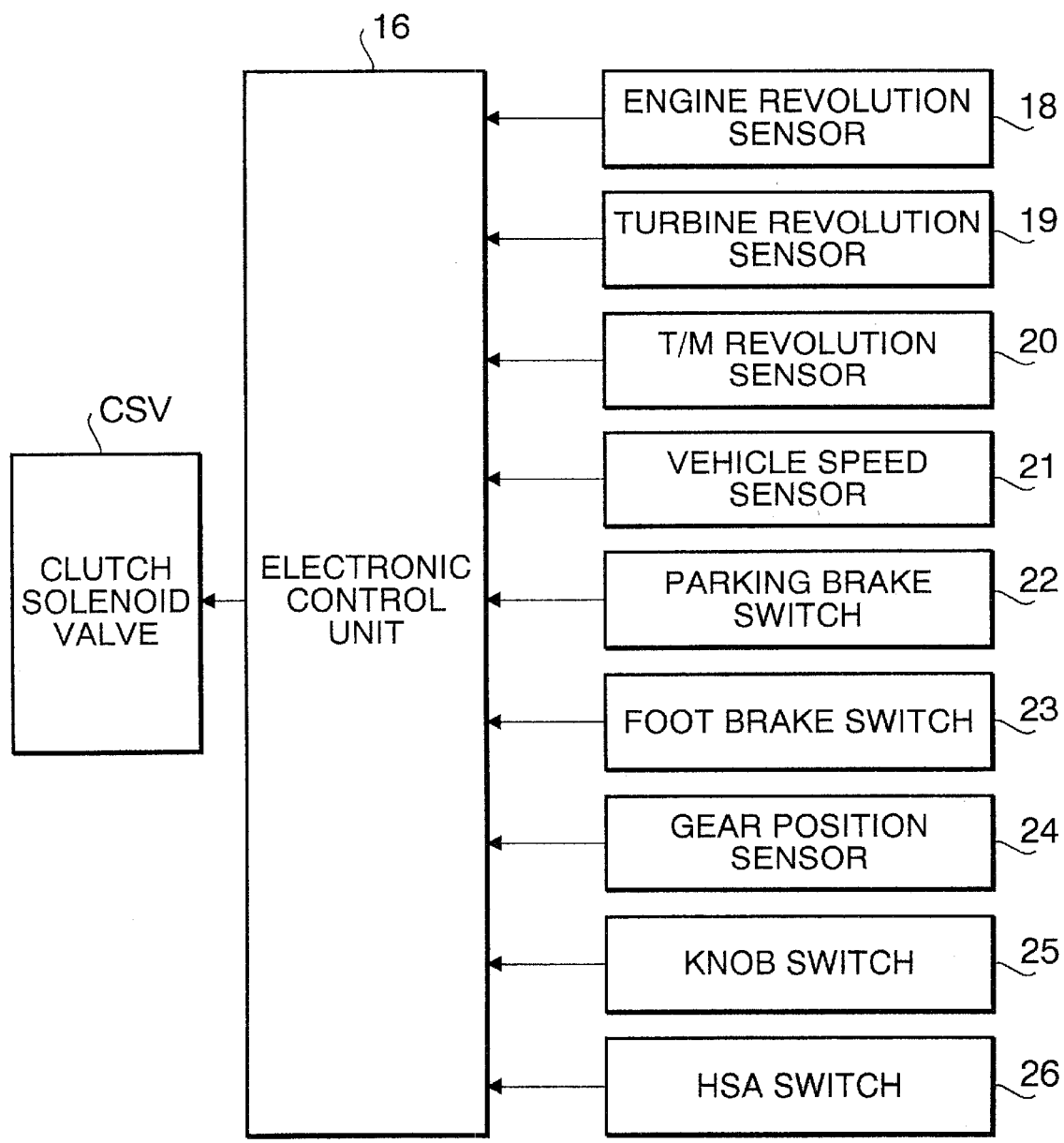
FIG. 4 is a structural diagram showing an electronic control unit according to an embodiment of the present invention.

Next, the electronic control device for electronically controlling the power transmission device is explained with reference to FIG. 4. In addition to the clutch solenoid valve CSV, the foregoing ECU 16 also has connected thereto various switches and sensors for electronically controlling the device. This includes an engine revolution sensor 18 for detecting the engine revolution, a turbine revolution sensor 19 for detecting the revolution of the input side of the clutch; that is, the revolution of the turbine 5, a transmission revolution sensor 20 for detecting the revolution of the transmission T/M, representatively the revolution of the input sub gear 12, and a vehicle speed sensor 21 for detecting the vehicle speed. These sensors are also shown in FIG. 1. Further, a parking brake switch 22 for detecting whether the parking brake is in use, a foot brake switch 23 for detecting whether the foot brake is in use, and a gear position sensor 24 for detecting which gear position the transmission is in are also included.

Moreover, a knob switch 25 is connected to the ECU 16. That is to say, in the present embodiment, in order to detect the timing of the gear operation started by the driver or to determine the timing of commencing the clutch disconnection, the shift knob is mounted such that it is able to oscillate slightly in the shifting direction with respect to the shift lever in the driver's cab, and a knob switch 25 is provided between this lever and shift knob. And, when the shift knob oscillates prior to the operation of the lever at the time the driver operates the transmission, the knob switch 25 is turned on, and the clutch disconnection is started with this as the signal. The specific structure is the same as that described in Japanese Patent Laid-Open Publication No. H11-236931.

Further, with the power transmission device of the present embodiment, a slope start auxiliary device (HSA; Hill Start Aid) illustrated in the aforementioned Publication is also provided, and an HSA switch 26 for manually turning on/off this device is provided in the driver's cab, and this HSA switch 26 is connected to the ECU 16. This HSA switch 26 is concurrently used as the trigger switch upon starting the torque point learning of the present invention, and the HSA in itself does not have significant meaning in the present invention.

Next, the operation of the power transmission device according to the present embodiment is explained.

With this power transmission device, the power of the engine E is transmitted to the fluid coupling 2, wet multiplate clutch 3, and transmission T/M in that order. In principle, the lockup clutch 7 is always turned on (connected) during motion after the start of the vehicle and turned off (disconnected) only when the vehicle is not in motion. Therefore, the creep of the fluid coupling 2 can be used at the time the vehicle starts moving, and, in comparison to those electrically controlling the start of the friction clutch, the control is simplified, and loss caused by slippage can be further prevented as the fluid coupling 2 is locked up when the vehicle is in motion. The wet multiplate clutch 3 is disconnected each time the gear is changed. This is the same as a standard MT vehicle.

Foremost, the operation at the time the vehicle starts moving is explained. Let it be assumed that, while the vehicle is not in motion and the gear is in neutral, the driver operates the shift lever to a starting gear in order to start the vehicle. Then, in the shift lever, the knob switch 25 is turned on pursuant to the oscillation of the shift knob prior to the operation of the lever, and the clutch 3 is segmentalized with this as the signal. The transmission T/M is geared to the starting gear when the shift lever is further operated, and the clutch 3 is connected when this is detected with the gear position sensor 24. Since the turbine 5 can be stopped from the driving wheel side pursuant to this connection, the pump 4 slides against the turbine 5, and a creep is generated thereby. The vehicle will thereby move by merely releasing the brake or stepping on the accelerator.

Next, the operation at the time of gear change while the vehicle is in motion is explained. Let it be assumed that, when the vehicle is traveling in a prescribed gear, the driver operates the shift lever to the next gear in order to change gears. Then, the knob switch 25 is turned on pursuant to the oscillation of the shift knob prior to the operation of the lever, and the clutch 3 is segmentalized with this as the signal. The transmission T/M is geared to the starting gear when the shift lever is further operated, and the clutch 3 is connected when this is detected with the gear position sensor 24. The gear change is completed thereby. The lockup clutch 7 is left on during the gear change, and the engine power is transmitted to the clutch 3 as is.

Incidentally, connection of the clutch 3 is conducted at high speed (rapid connection) from complete disconnection to the vicinity of the torque point, and at low speed (gradual connection) from the vicinity of the torque point. The successful combination of reducing the connection shock and shortening the connection time is being sought by switching the connection speeds as described above.

And, it is important to know the position where the clutch begins to connect; that is, the torque point which is capable of initially transmitting a prescribed torque. This is because the connection speed switching point is determined based on this torque point.

The torque point has individual differences and variances per clutch, and cannot be uniformly determined. Regarding the present embodiment, as shown in FIG. 3, even if the same duty pulse is provided, nearly all cases deviate as shown with the arrow in the clutch torque capacity line diagram. Therefore, it is necessary to learn the torque point per clutch or per vehicle. Those controlling a conventional dry friction clutch are able to determine the torque point pursuant to the clutch stroke thereof Nevertheless, the same method cannot be adopted since the concept of stroke does not exit in the first place in a wet multiplate clutch as with the present invention.

Thereby, in the present invention, the duty ratio value of the duty pulse output from the ECU 16 itself is made the learned torque point value. This is described in detail below.

Figure 5:
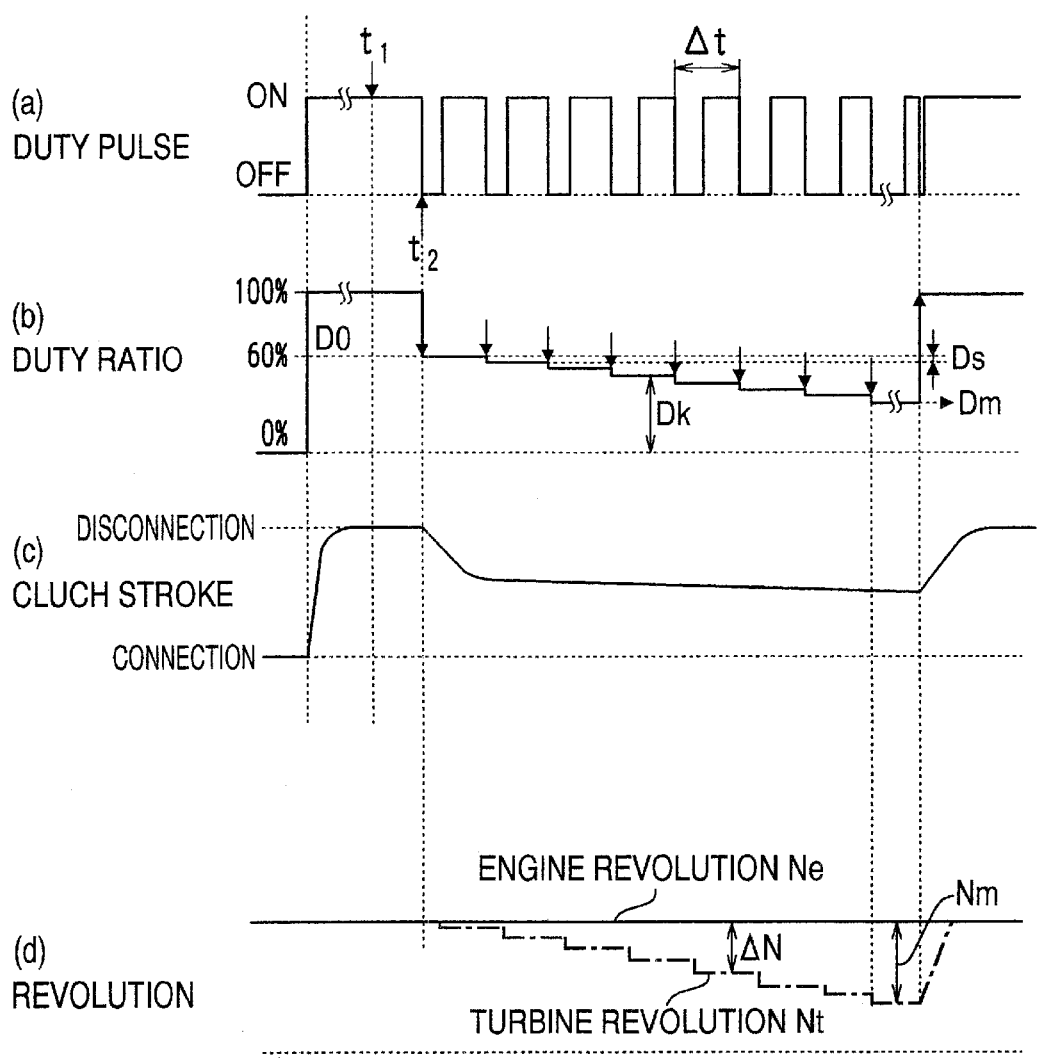
FIG. 5 is a time charge showing the first mode of the torque point learning control according to an embodiment of the present invention.

FIG. 5 is a time chart representing the contents of the torque point learning control according to the present invention, whereby (a) shows the duty pulse output from the ECU 16, (b) shows the change of the duty ratio D thereof, (c) virtually shows the clutch stroke of the wet multiplate clutch 3 for ease of comprehension, and (d) shows the changes in the revolution of the engine E (engine revolution Ne) and the revolution of the turbine 5 (turbine revolution Nt). As shown in (a), the time cycle of the torque learning control is $\Delta t$, and $\Delta t=20$ (msec) in the present embodiment.

Foremost, let it be assumed that a prescribed learning condition is satisfied at time t1. Here, the duty ratio D=100 (%), and the clutch is completely disconnected. Therefore, the turbine 5 revolves with the pump 4, and the turbine revolution Nt coincides with the engine revolution Ne. Thereafter, learning is commenced when a prescribed learning starting condition is satisfied at time t2. Initially, the duty ratio D is lowered relatively largely to the connection side in order to make the start duty D0=60(%). This is in order to shorten the learning period. Needless to say, the value of the start duty D0 is determined such that the clutch will not on no account reach the target torque point even if there are variances, but made to approach the torque point as much as possible. In other words, D=100 to 60(%) could be referred to as an invalid region (allowance) in the clutch, and the goal here is to connect such invalid region at once in order to shorten the learning time.

According to FIG. 3, the torque capacity remains at 0 when the duty ratio D moves from 100(%) to 60(%). It is therefore advisable that this type of invalid portion be connected at once. The start duty D0 is predetermined based on experimental data as illustrated in FIG. 3.

Next, after having completed the connection up to the point close to the torque point, the clutch connection speed is reduced extremely by making the connection width per cycle small. In other words, as shown in FIG. 5, the diminution of the duty ratio per cycle is given as the step duty Ds (0.048(%) in the present embodiment), and the duty ratio D is lowered one Ds at a time for each control performed. The duty D of each control performed is a value of having deducted the step duty Ds from the previous value, and this is given as a gradual connection duty Dk.

As described above, by gradually connecting the clutch, the turbine revolution Nt decreases against the engine revolution Ne. That is, the output side is stopped with the brake in a state where the gear of the transmission is in use, and the output side of the clutch is therefore unable to revolve. Contrarily, the pump 4 continues to be driven by the engine E. Therefore, if the clutch is connected further, the input side of the clutch; that is, the turbine 5, tries to stop and gradually reduces its revolution, and, simultaneously, the sliding between the pump 4 and the turbine 5 gradually increases, and the turbine revolution Nt gradually decreases against the engine revolution Ne.

Therefore, when the difference $\Delta N=Ne-Nt$ of these revolutions reaches a prescribed value Nm, the duty ratio D value at such time is learned by the ECU 16 as the learned torque point value Dm. In the present embodiment, Nm=300 rpm. More specifically, when the difference $\Delta N=Ne-Nt$ of engine revolution Ne detected with the engine revolution sensor 18 and the turbine revolution Nt detected with the turbine detection sensor 19 becomes a prescribed value Nm or more during the process of the ECU 16 slowly connecting the clutch by lowering the duty ratio D one step duty Ds at a time, the value of the duty ratio D of the duty pulse sent from the ECU 16 itself at such time is stored in the memory of the ECU 16 as the learned torque point value Dm.

The learning is substantially over upon storing such learned torque point value Dm, and the entire learning control (learning mode) is ended upon completely disconnecting the clutch thereafter.

With reference to FIG. 3, assuming that the revolution difference $\Delta N$ becomes a prescribed value Nm or more for the first time when the duty ratio D=50(%), for example, the torque capacity of the clutch 3 at such time is Tcm= approximately 200 (Nm), and this will be the torque point. Since the torque capacity and the revolution difference $\Delta N$ is of a unique relationship even if the torque capacity line diagram deviates due to variances in the clutch or the like, a point showing the same torque capacity Tcm can be detected so as long as a duty ratio D showing the same revolution difference Nm is detected. A fixed torque point can be constantly detected and learned regardless of the individual differences in the clutch.

Thus, according to the present invention, the torque point may be suitably learned even in a wet multiplate clutch, and this may be employed in various clutch controls, such as for switching the connection speed upon accurately knowing the torque point differing for each clutch. And, by absorbing the variances and individual differences of the clutch or the control devices thereof, the wet multiplate clutch may be connected with the same feeling in any vehicle.

Moreover, this learning is conducted after waiting a prescribed time upon detecting that the revolution difference $\Delta N$ became a prescribed value Nm or more. In other words, even if $\Delta N \geq Nm$ is detected, there are cases where this is caused by noise or the like, and an inaccurate learning value will be learned immediately after the detection thereof, which will hinder the subsequent clutch control.

Therefore, if $\Delta N \geq Nm$ is still satisfied even after waiting a prescribed time after the detection, this will be deemed as correct, and learning will be conducted. A highly reliable and accurate learning value can be stored thereby.

Figure 6:
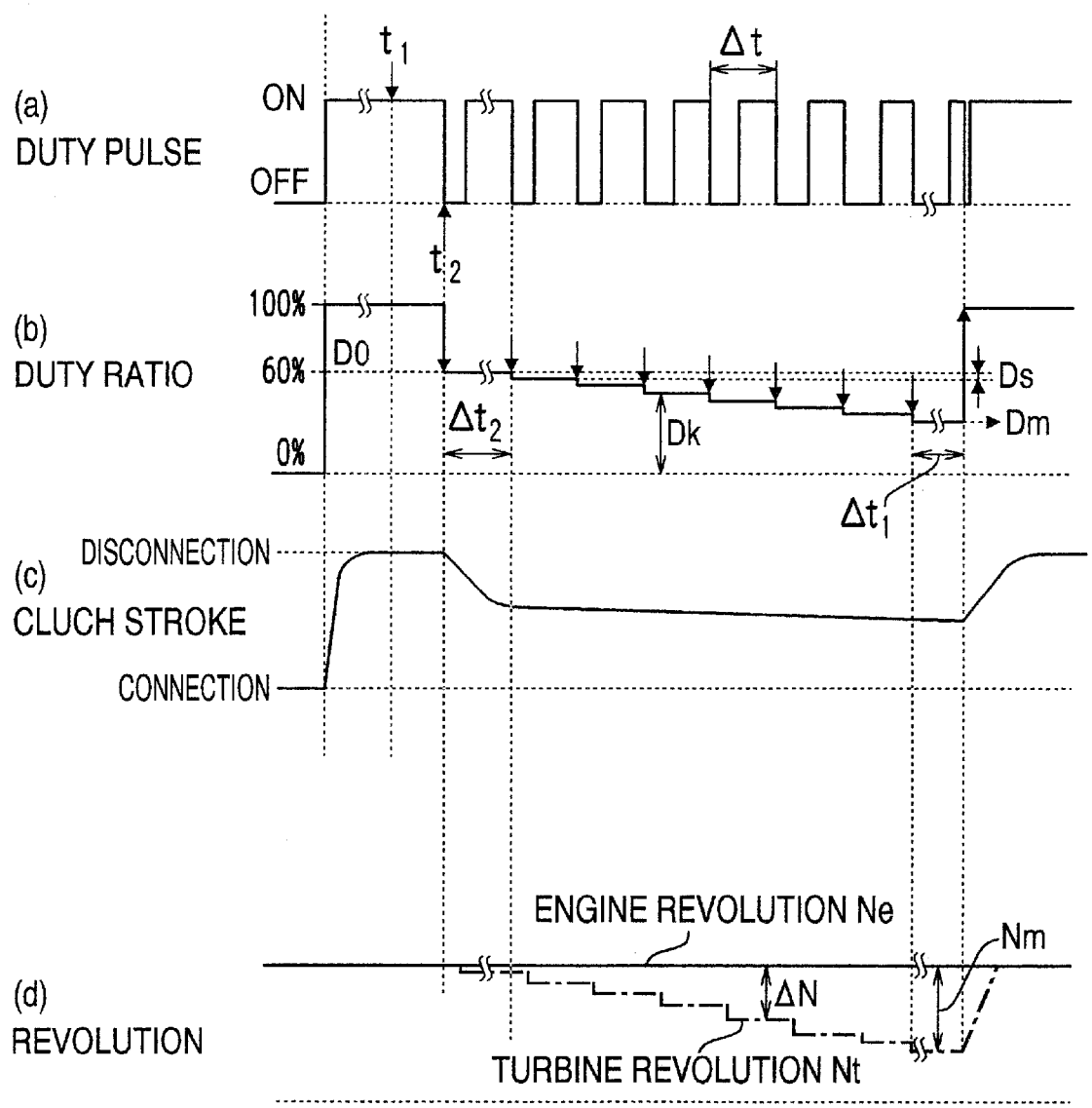
FIG. 6 is a time charge showing the second mode of the torque point learning control according to an embodiment of the present invention.

Specifically, as shown in FIG. 6, from the time $\Delta N \geq Nm$ is detected, while retaining the value of the duty D at such time, the elapse of a prescribed waiting time $\Delta t1=1$ (sec) longer than an ordinary control cycle $\Delta t=20$ (msec) is awaited, and, if $\Delta N \geq Nm$ is still satisfied at the elapse of waiting time $\Delta t1$, the retained duty value is stored as the learning value Dm. This method conducts the learning if $\Delta N \geq Nm$ at the beginning and end of the waiting time $\Delta t1$. Alternatively, there is a method of conducting the learning if $\Delta N \geq Nm$ is constantly satisfied during the waiting time $\Delta t1$. In either case, the learning is conducted after a prescribed time $\Delta t1$ longer than a prescribed cycle $\Delta t$ elapses upon the detection of the turbine revolution Nt decreasing a prescribed revolution Nm against the engine revolution Ne. In addition, here, the waiting time $\Delta t1=1$ (sec) is an exemplification, and the length of the waiting time may be suitably changed.

Moreover, preferably, as shown in FIG. 6, after the output of the start duty D0, such start duty D0 is retained for a prescribed time $\Delta t2=0.5$ (sec), and the output of the gradual connection duty D1 is commenced after the elapse of such time $\Delta t2$. That is, the output of the start duty D1 is commenced after waiting a prescribed time $\Delta t2$ after the output of the start duty D0.

As described above, even if the start duty D0 is output, the pressing of the clutch plate will not begin until the clutch piston makes a small stroke (approximately 2 mm) in the allowance, and, therefore, some time will be required to obtain a connection state comparable to the start duty D0. Contrarily, a connection state comparable to the start duty D0 cannot be obtained within a short time of $\Delta t=20$ (msec). Since this kind of response delay occurs, if the output of the gradual duty is commenced (from the subsequent control) immediately after the output of the start duty, the deviation of the response delay portion will constantly be carried over during the gradual connection, and there is a possibility that a value closer to the connection side will be learned instead of the true torque point upon such learning. This will lead to a problem of the clutch connection shock becoming large since the learning value deviating toward the connection side will also be used in a standard clutch connection control.

Thereby, by retaining the start duty D0 after the output thereof and commencing the output of the gradual connection duty Dk after the elapse of a prescribed time Δt2=0.5 (sec) longer than a control cycle Δt=20 (msec), the initial stroke of the clutch piston will be completed within such time Δt2 and the gradual connection of the clutch can be commenced upon obtaining the connection state comparable to the start D0. Thus, the response delay may be absorbed, an accurate learning value corresponding to the true torque point may be learned, and a large connection shock even in an ordinary clutch connection control may be prevented. Moreover, time Δt2=0.5 (sec) is an exemplification, and may be suitably changed.

According to the present learning method described above, since learning is conducted after a prescribed time elapses from the detection of the turbine revolution decreasing a prescribed revolution against the engine revolution, an accurate torque point may be learned, and the reliability will thereby increase.

Further, since the output of the gradual connection duty is commenced after a prescribed time elapses after the start duty is output, the response delay may be absorbed during clutch connection, an accurate learning value corresponding to the true torque point may be learned, and a large connection shock even in an ordinary clutch connection control may be prevented.

Incidentally, the clutch connection control after the learning of the torque point is as follows. In other words, in a state where the clutch is disconnected at duty ratio D=100(%), the duty ratio of the value (large value) slightly on the disconnection side in comparison to the learned torque point value Dm is foremost provided to the clutch solenoid valve CSV. This is referred to as a single connection control. The invalid portions of the clutch are rapidly connected thereby, and the connection time may be shortened. In this state, preferably, after waiting a prescribed time, the duty ratio is subtracted in small step duties. The clutch is gradually connected as a result thereof, and the clutch connection shock may be prevented thereby.

Figure 8:
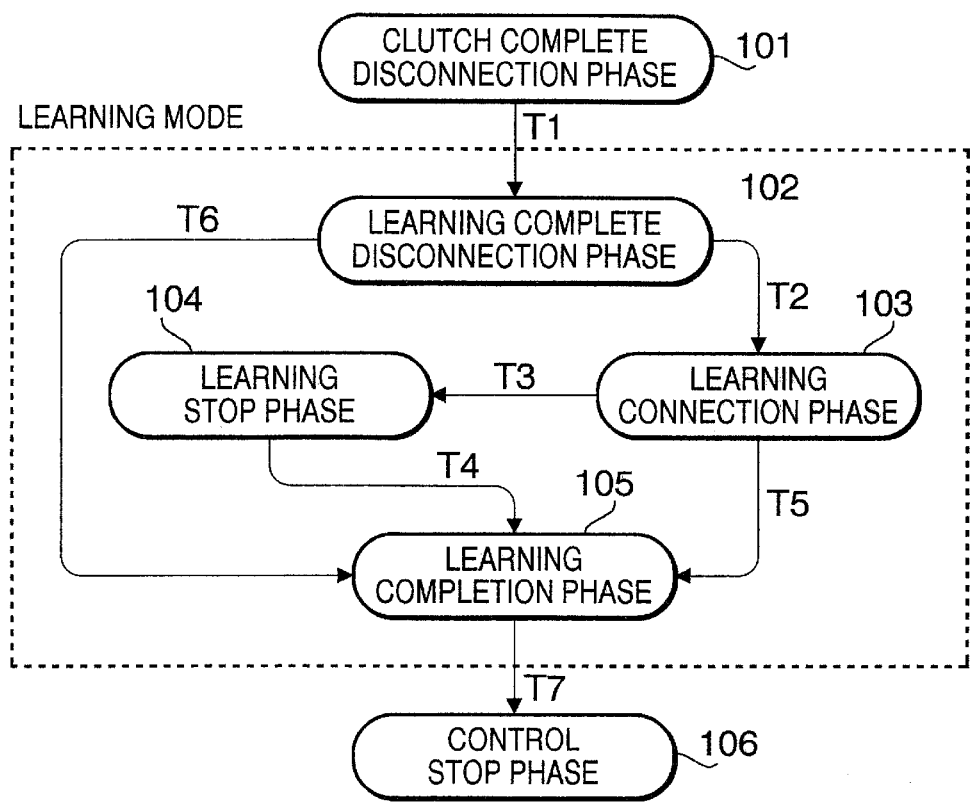
FIG. 8 is a state transition diagram showing the transition of the clutch control phase according to an embodiment of the present invention.

Next, the contents of the torque point learning control are described in detail with reference to FIG. 8. FIG. 8 is a condition transition diagram showing the transition of the clutch control phase.

Torque point learning may be conducted arbitrarily pursuant to the intention of the driver. When the driver wishes to conduct such learning, the driver foremost operates the shift lever into neutral(N). In the present device, since the clutch is disconnected when the gear is in neutral during a standard control of a clutch, and connected when the gear is operated, the clutch will automatically disconnect by operating the shift lever to N.

This condition is referred to as the clutch complete disconnection phase 101 as shown in FIG. 8. In other words, a duty D0=100(%) is output from the ECU 16 at such time, and the clutch is thereby completely disconnected.

Next, when a prescribed condition is satisfied from this state, the routine enters the learning mode, and proceeds to the learning complete disconnection phase 102. The transition condition T1 at such time satisfies:
(1) Stopped vehicle (vehicle speed=0 km/h);
(2) Transmission T/M is in neutral;
(3) Engine E is in the vicinity of an idling revolution (Ne=300 to 800 rpm, the idling revolution in the present embodiment is 600 rpm);
(4) Parking brake is in use;
(5) Foot brake is in use;
and, while maintaining the foregoing state,
the HSA switch 26 is turned on.

In this phase also, the clutch is completely disconnected; that is, duty D=100(%) is constantly output from the ECU, and the complete disconnection of the clutch is maintained. Moreover, since the foot brake is being stepped on pursuant to condition (5) above, the acceleration is in a released state, and, unless the engine is making an extreme fast idling operation, ordinarily, condition (3) will be satisfied. Other conditions may be suitably added to this transition condition T1.

Satisfaction of the learning condition of time t1 in FIG. 5 and FIG. 6 implies the satisfaction of the aforementioned transition condition T1. In FIG. 5 and FIG. 6, the clutch is completely disconnected pursuant to the clutch complete disconnection phase 101 prior to time t1, and the clutch is completely disconnected pursuant to the learning complete disconnection phase 102 after time t1.

Next, the routine proceeds to the learning gradual connection phase 103 when the transition condition T2 from this learning complete disconnection phase 102 is satisfied. The transition condition phase T2 implies that:
(1) The transmission T/M has been put into second gear.

In other words, when the driver operates the gear into second gear from the state of the learning complete disconnection phase 102, the routine proceeds to the learning gradual connection phase 103, and the clutch connection is automatically commenced. In other words, the gear change into the second gear is the signal for commencing the learning. Moreover, conditions may also be suitably changed or added in this transition condition T2. The second gear is an exemplification, and any gear may be used so as long as the output side of the clutch can be stopped with the brake. Nevertheless, the gear must be operated in one of the gears. Since the vehicle (truck or the like) in the present embodiment often starts in second gear, the second gear is used in the learning since this is realistic.

Satisfaction of the learning condition of time t2 in FIG. 5 and FIG. 6 implies the satisfaction of the aforementioned transition condition T2. As also shown in FIG. 5, at the learning gradual connection phase 103, the clutch is connected in a relatively broad manner after initially outputting the start duty D0=60(%) from the ECU 16, and, preferably as also shown in FIG. 6, the start duty D0=60(%) is retained for a prescribed time Δt2=0.5 (sec), the duty ratio D is reduced by a step duty Ds=0.048(%) at a time for each control thereafter, and the clutch is gradually connected thereby.

The routine proceeds to the learning stop phase 104 when the transition condition T3 from this learning gradual connection phase 103 is satisfied. The transition condition phase T3 implies that:
(1) The revolution difference ΔN=Ne−Nt of the engine revolution Ne and turbine revolution Nt became a prescribed value Nm=300 (rpm) or more.

At this learning stop phase 104, the duty ratio D when (1) is satisfied is retained for a prescribed time (plurality of cycles) in order to retain the clutch in the current condition. The duty ratio D at such time is temporarily incorporated in the ECU 16, and judged is whether this value is the normal value as the learning value by comparing prescribed conditions. If normal, this value is newly learned as a new learning value Dm. The old learning value stored previously will be deleted at such time.

In addition, preferably, as also shown in FIG. 6, the duty D at the time (1) is satisfied is retained for the aforementioned waiting time $\Delta t1=1$ (sec) in order to retain the clutch in the current condition, judged is whether condition (1) is satisfied once again simultaneously with the elapse of the waiting time $\Delta t1$, and, if satisfied, the value of such duty D is temporarily incorporated in the ECU 16. Then, judged is whether this value is the normal value as the learning value by comparing prescribed conditions, and, if normal, this value is newly learned as a new learning value Dm. The old learning value stored previously will be deleted at such time.

Moreover, conditions other than (1) above may also be suitably adopted with respect to this transition condition 3. Condition (1), when the engine is at an idling revolution= 600 (rpm), (1)' may be rephrased such that the turbine revolution Nt became less than ½ of the engine revolution Ne. Or, condition (1) may be replaced with:

(1)'' a condition of the engine revolution Ne decreasing a prescribed revolution.

The reason for this is because the engine revolution Ne will decrease by being dragged pursuant to the decrease of the turbine revolution Nt, and the torque learning point may be determined upon viewing the degree of decrease in the engine revolution Ne. For example, the diminution of the engine revolution Ne is set to 50 (rpm).

Next, the routine proceeds to the learning completion phase 105 when the transition condition T4 from this learning stop phase 104 is satisfied. The transition condition phase T4 implies that:

(1) In addition to the condition of a normal completion of the learning of the learned torque point value Dm;
(2) The vehicle started moving (vehicle speed≠0 km/h);
(3) The knob switch of the first, third or fifth gear is turned on;
(4) The engine revolution became close to the idling revolution (Ne<300 rpm or <800 rpm);
(5) The parking brake is no longer in use; or
(6) The foot brake is no longer in use.

Conditions (2) through (6) particularly imply that it is not an appropriate situation for implementing the learning, and, even at the time the conditions of the learning complete disconnection phase 102 and learning gradual connection phase 103 are satisfied, the routine proceeds to the learning completion phase 105. In other words, transition conditions T6 and T5 from the learning complete disconnection phase 102 and learning gradual connection phase 103 to the learning completion phase 105 are equal to T4. There are various other conditions that are inappropriate in implementing the learning.

At the learning completion phase 105, duty D=100(%) is output from the ECU 16 in order to completely disconnect the clutch. The transition condition T7 is satisfied pursuant to this output, and the routine exits the learning mode and returns to the standard control, and arrives at the control stop mode 106. At the control stop mode 106, although the complete disconnection of the clutch is maintained by maintaining the duty D=100(%), this will yield a condition differing from an ordinary situation where the gear is in second but the clutch is disconnected. This, however, will return to the ordinary control by the driver placing the gear in neutral.

The torque point learning method was described in detail above and, now, the contents of a standard clutch connection control and the correction of control value are explained based on the learned torque point value obtained above. Here, the control is basically an open control, and, the ECU 16 outputs a duty pulse in accordance with a prescribed predetermined program as shown in FIG. 9, and the clutch is connection in accordance therewith.

Figure 9:
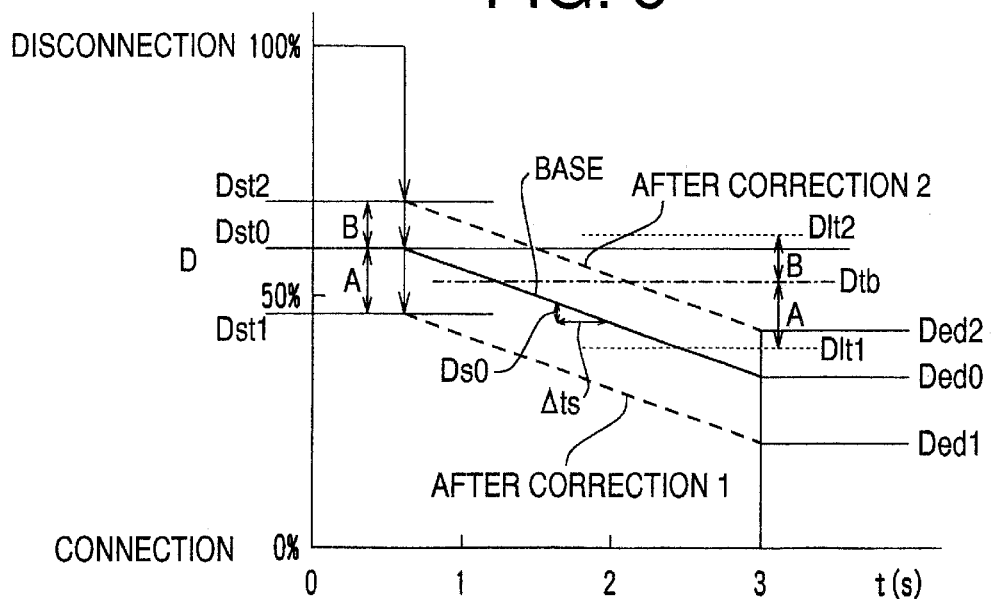
FIG. 9 is a time charge showing the first mode of the standard clutch connection control according to an embodiment of the present invention.

FIG. 9 is a time chart representing the contents of the clutch connection control. The horizontal axis is time t, and the vertical axis is the duty ratio D output from the ECU 16. The solid line is a line diagram to be the base prior to correction, and the broken line is a line diagram (after-correction 1, 2) of two patterns after-correction.

Foremost, the standard clutch connection control is explained in the base. The signal connection duty; that is, the start duty Dst0, initially output from the completely disconnected state (D=100(%)), the end duty Ded0 which determines the end of the gradual connection of the clutch, and a step duty Ds0 which is the diminution width of each control cycle are selected from a map previously stored in the ECU 16. The map is prepared in advance based on experiments or the like such that the various optimum values reflecting the driving condition of the vehicle may be obtained. Further, the base width of the learned torque point value is stored in the ECU 16 beforehand as Dtb. Here, Dtb=53.5(%).

With the clutch connection control in this case, the start duty Dst0 is initially output from a completely disconnected state (D=100(%)), and, after the implementation of a single connection, the duty ratio is reduced one step duty Ds0 at a time, and the connection is conducted in a half clutch. And, upon reaching the end duty Ded0, D=0(%) is output in order to completely connect the clutch.

Figure 10:
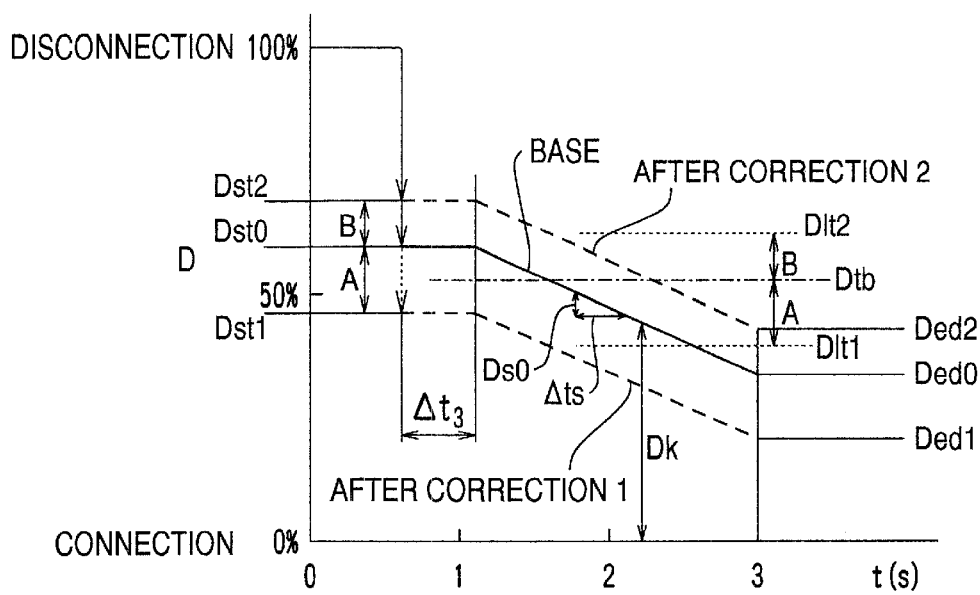
FIG. 10 is a time charge showing the second mode of the standard clutch connection control according to an embodiment of the present invention.

In addition, preferably, as shown in FIG. 10, after connecting the clutch (single connection) up to a point close the torque point upon initially outputting the start duty Dst0 from the completely disconnected state (D=100%), the start duty Dst0 is retained for a prescribed time $\Delta t3$ and reduced by one step duty Ds0 at a time in order to conduct the gradual connection in a half clutch. And, upon reaching the end duty Ded0, D=0(%) is output in order to completely connect the clutch. As clear from the diagram, the start duty Dst0 is a value slightly to the disconnection side (large) in comparison to the base value Dtb of the learned torque point value, and the clutch is thereby connected at once up to a point close to the torque point.

Similar to the above, the control cycle is $\Delta t=20$ (msec). The diminution cycle pursuant to the step duty Ds0; that is, the diminution cycle $\Delta ts$ of the gradual connection duty Dk may be made equivalent to the control cycle $\Delta t$, or may be made equivalent to a plurality of cycles (3 cycles=$3\Delta t$ for example). Including the foregoing cases, the waiting time $\Delta t3$ after the start duty is longer in comparison to the diminution cycle $\Delta ts$. For example, $\Delta t3$ is 0.2 (s) upon an upshift, and 0.5 (s) upon a downshift. Since the gradual connection will be commenced after the elapse of a sufficient waiting time $\Delta t3$ after the output of the start duty, the response delay of the clutch may be absorbed as in the case of learning. Moreover, when making the diminution cycle $\Delta ts$ of the gradual duty Dk equivalent to a plurality of control cycles $n\Delta$ (n is an integral number of 2 or more), the value of n may be selected from the map.

The step duty Ds0 is set to be a value larger than the step duty Ds during the learning, or, in other words, the gradual connection of the clutch is conducted more slowly during learning than normal. Normally, the overall connection time is approximately 1 to 3 seconds, but a longer time; for example, approximately 5 to 6 seconds, is used for the connection during the learning.

Meanwhile, pursuant to the implementation of the torque point learning, the learned torque point value is renewed to Dlt1, which is smaller than the base value Dtb (after-correction 1). Then, the start duty and end duty are corrected as follows, and the duty line diagram becomes the base line diagram moved parallel to the connection side as shown with the broken line of after-correction 1.

In other words, foremost, the difference $\Delta Dse=Dst0-Ded0$ of the start duty Dst0 and end duty Ded0 for prescribing the half clutch connection range, and the difference $A=Dtb-Dlt1 (>0)$ of the base value Dtb and renewal value Dlt1 of the learned torque point value are calculated. Then, the start duty Dst1 after-correction is calculated based on the formula of:

$$Dst1=Dst0-A,$$

and the end duty Ded1 after-correction is calculated based on the formula of:

$$Ded1=Dst1-\Delta Dse.$$

The clutch connection control of after-correction 1 is implemented by employing the start duty Dst1 and end duty Ded1. The subsequent clutch connection control, similar to the above, employs the base value of the start duty and end duty obtained from the map for each control upon correcting it based on the difference A of the base value Dtb and renewal value Dlt1 of the learned torque point value.

After-correction 1 is an example where the renewal value Dlt1 of the learned torque point value became smaller than the base value Dtb, and, contrarily, after-correction 2 is an example where the renewal value Dlt2 became larger than the base value Dtb.

In the case of this after-correction 2, similarly, the difference $\Delta Dse=Dst0-Ded0$ of the start duty Dst0 and end duty Ded0, and the difference $B=Dtb-Dlt2 (<0)$ of the base value Dtb and renewal value Dlt2 of the learned torque point value are calculated. Then, the start duty after-correction is calculated based on the formula of:

$$Dst2=Dst0-B,$$

and the end duty after-correction is calculated based on the formula of:

$$Ded2=Dst2-\Delta Dse.$$

The clutch connection control of after-correction 2 is implemented by employing the start duty Dst2 and end duty Ded2. The subsequent clutch connection control also employs the base value of the start duty and end duty obtained from the map for each control upon correcting it based on the difference B of the base value Dtb and renewal value Dlt2 of the learned torque point value.

Figure 7:
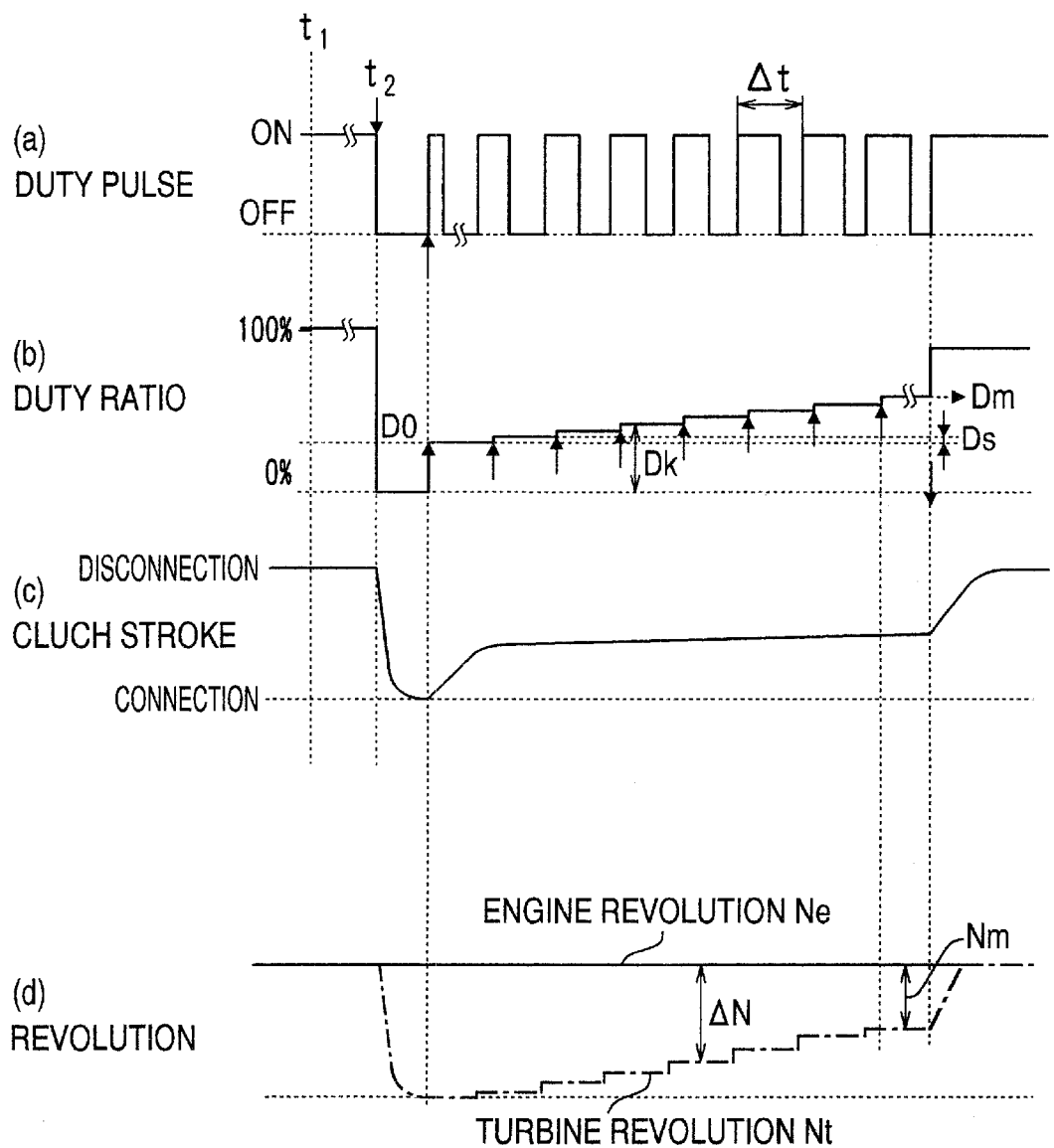
FIG. 7 is a time charge showing the third mode of the torque point learning control according to an embodiment of the present invention.

Further, embodiments of the present invention are not limited to the above. For example, as the learning method, contrary to the method of gradually connecting the clutch as shown in FIG. 5 and FIG. 6, there is a method of gradually disconnecting the clutch. In this case, as shown in FIG. 7, the clutch is completely connected simultaneously (time t2) with the satisfaction of the learning commencement condition, and, after broadly disconnecting the clutch upon outputting a start duty D0 (40% for example), the clutch is gradually disconnected upon increasing the duty ratio D one step duty Ds at a time. And, when the difference N of the engine revolution Ne and turbine revolution Nt becomes a prescribed value Nm or less, the ECU 16 learns the value of the duty ratio at such time as the learned torque point value Dm.

Preferably, similar to the above, the waiting time is set to $\Delta t2$ at the time the start duty D0 is output, and, when the difference N of the engine revolution Ne and turbine revolution Nt becomes a prescribed value Nm or less, similar to the above, the waiting time is set to $\Delta t1$.

Next, another mode of a standard clutch connection control is explained with reference to FIG. 11 and FIG. 13. The control here is also an open control, and, the ECU 16 outputs a duty pulse in accordance with a prescribed predetermined program as shown in FIG. 11, and the clutch is connection in accordance therewith.

Figure 11:
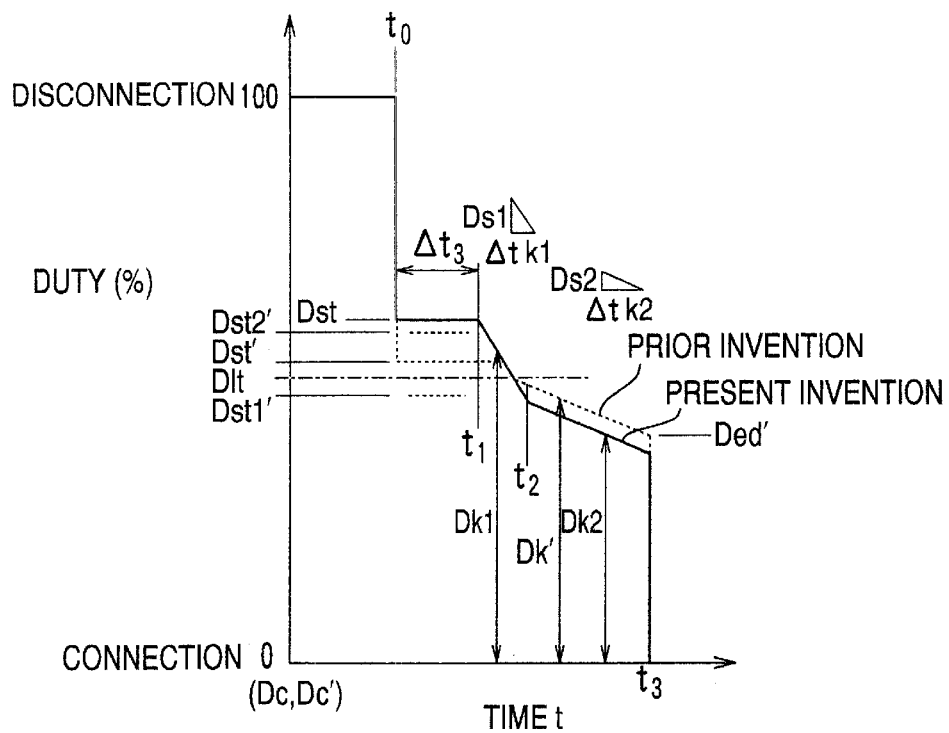
FIG. 11 is a time charge showing the third mode of the standard clutch connection control according to an embodiment of the present invention.

In FIG. 11, the horizontal axis is time t, and the vertical axis is the duty D output from the ECU 16. Control is performed each prescribed control cycle $\Delta t=20$ msec. Here, assumed is a case of a so-called garage shift upon starting the vehicle; that is, a state where the driver operates the shift from neutral to the starting gear while the brake is in use and the vehicle is in an idling state, and a creep is generated as a result of the clutch being connected. In FIG. 13, the horizontal axis is time t, and the vertical axis is the revolution, and the engine revolution Ne is shown with a solid line, and the clutch revolution Nt is shows with a chain line. The engine revolution Ne is steady at an idling revolution=600 rpm, and, since the gear is in neutral and the clutch is completely disconnected during the initial stage, the pump and turbine of the fluid coupling revolve together, and the clutch revolution Nt coincides with the engine revolution Ne.

As shown in FIG. 11, the gear-in is completed at time t0, and a gear-in signal is sent from the gear position sensor 24 to the ECU 16. Then, a single connection duty; that is, the start duty Dst is initially output from the ECU 16 during a completely disconnected state (D=100(%)), and a single connection control is implemented thereby. The start duty Dst is constantly predetermined so as to prevent the generation of an excess clutch connection shock in consideration of the clutch being broadly connected up to a point close to the torque point and variances in the torque point. In the example of FIG. 11, even if the optimum start duty value, Dst2' for example, deviates to the utmost disconnection side due to disturbances such as individual differences of the clutch, driving condition, change in properties with time or the like, the start duty Ds is experientially or experimentally determined so as to be such deviated value or more. Moreover, the start duty Ds is also a value in the vicinity of, or which approaches, the learned torque point value Dlt. In the present embodiment, Dst=60%. Thus, in the present invention, a single connection can be implemented up to a position farther from the torque point in comparison to prior inventions.

Meanwhile, after the start duty Dst is output, this start duty Dst is retained for a prescribed time $\Delta t3$ (0.2 (sec) during an upshift and 0.5 (sec) during a downshift in the present embodiment), and the output of the first gradual connection Dk1 is commenced after the elapse of such time $\Delta t3$. The reason for waiting the elapse of the prescribed time $\Delta t3$ is because, as described above, even if the start duty Dst is output, the pressing of the clutch plate will not begin until the clutch piston makes a small stroke (approximately 2 mm) in the allowance, and, therefore, there is a response delay in which a connection state comparable to the start duty Dst cannot be immediately obtained. By waiting the aforementioned time $\Delta t1$, the response delay can be absorbed, and the subsequent gradual connection control can be performed as aimed.

The output of the first gradual connection duty Dk1 is commenced at time t1 after the elapse of time Δt3. The first gradual connection duty Dk1 is a duty wherein the clutch is gradually connected in a relatively fast speed, and is a value obtained by decreasing the first step duty Ds1 from the previous duty value. In other words, the first step duty Ds1 is set to a relatively large value, and here it is 0.4%. Here, as described above, the duty is decreased one step duty Ds1 at a time in order to conduct a first gradual connection at a speed faster than the gradual connection of prior inventions. Further, the diminution cycle Δtk1 of the gradual connection duty Dk1 is made equal to one control cycle Δt in the present embodiment, but this, for example, may be made equal to a plurality of control cycles nΔt.

Figure 13:
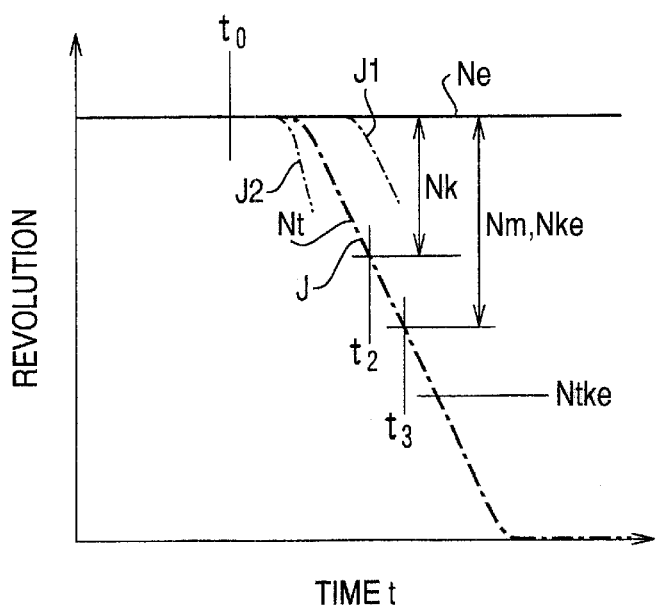
FIG. 13 is a time chart showing the changes in the engine revolution and the turbine revolution at the time of clutch connection.

When conducting this type of fast gradual connection, as shown in FIG. 13, the turbine revolution Nt will eventually decrease against the engine revolution Ne. And when this diminution or revolution difference reaches a prescribed value Nk or more, the gradual connection speed at such time t2 is switched to a slower speed. In the present embodiment, Nk=200 rpm.

As shown in FIG. 11, the output of the second gradual connection duty Dk2 is commenced at time t2. The second gradual connection duty Dk2 is a duty wherein the clutch is gradually connected in a relatively slow speed, and is a value obtained by decreasing the second step duty Ds2 from the previous duty value. The second step duty Ds2 is set to a relatively small value, and here it is 0.02%. Here, as described above, the duty is decreased one step duty Ds2 at a time in order to conduct a second gradual connection at the same speed as with the gradual connection of prior inventions. Further, the diminution cycle Δtk2 of the gradual connection duty Dk2 is made equal to one control cycle Δt in the present embodiment, but this, for example, may be made equal to a plurality of control cycles nΔt.

Pursuant to this type of slow gradual connection, as shown in FIG. 13, the turbine revolution Nt further decreases against the engine revolution Ne. And, when the revolution difference ΔN=Ne−Nt reaches Nke (300 rpm in the present embodiment) or more (time t3), complete connection duty Dc=0% is output from such time, and the clutch is completely connected at once. As shown in FIG. 6, the turbine revolution Nt also decreases to 0, and a start-standby creep is generated thereby.

Accordingly, with the present control method, since the start duty Dst is determined as described above, excess clutch connection shock will not occur due to the single connection even if the optimum start duty value deviates to the utmost disconnection side due to disturbances of individual difference or the like. And, since a fast gradual connection is conducted, it is possible to immediately catch up with the level of the prior invention even if the single connection is ended at a position farther than the prior invention with respect to the torque point, and it is thereby possible to prevent a time lag. Here, a connection shock will not occur even upon conducting this type of fast gradual connection. This is because the fast gradual connection is only conducted up to the stage of initial connection. Within the range where the difference between the engine revolution Ne and the turbine revolution Nt is Nke=300 rpm or less, even if the connection is somewhat fast, this will not emerge as a shock that will be felt by the driver. This implies that the problem of connection shock is also overcome. After the completion of this fast gradual connection, a slow gradual connection is conducted as with the prior invention, and the clutch may be smoothly connected while preventing the connection shock.

Thus, according to the control method of the present invention, redundancy can be maintained and the successful combination of the time lag and shock at the time of clutch connection can be sought even when the optimum starting duty value varies or deviates due to disturbances. Particularly when the vehicle starts moving, the garage shock and time lag can be effectively prevented, thereby enabling a smooth start.

Figure 12:
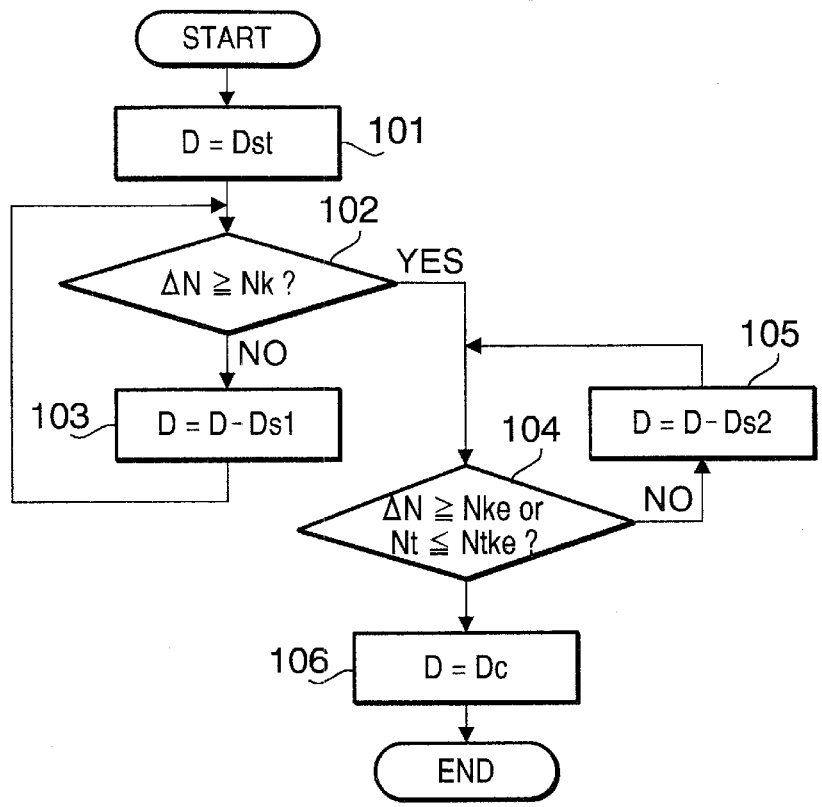
FIG. 12 is a flowchart relating to the third mode of the standard clutch connection control according to an embodiment of the present invention.

Next, the contents of the clutch control are explained with reference to the flowchart shown in FIG. 12.

This flow is started when a gear-in signal is input to the ECU 16. Foremost, at step 101, the duty D output from the ECU 16 is given as start duty Dst=60%. Although the elapse of a prescribed time Δt3 is waited thereafter, this point is omitted in the illustrated flowchart. Next, at step 102, judged is whether the difference ΔN of the engine revolution Ne and the turbine revolution Nt (=Ne−Nt) is prescribed value=200 rpm or more. The routine proceeds to step 103 since this will not apply in the initial stage, and the duty D output this time is given as a value having deducted the first step Ds1=0.4% from the previous value (D−Ds1). Eventually, at step 102, ΔN≧Nk will be satisfied. Then the routine proceeds to step 104 in order to judge whether the revolution ΔN became Nke=300 rpm or more, or whether the turbine revolution Nt became Ntke=200 rpm or less. In other words, in addition to the foregoing condition of ΔN≧Nke, the gradual connection speed is switched to a lower speed when the condition of Nt≧Ntke is satisfied. This is because there are cases where the turbine revolution Nt becomes lower than Ntke prior to the revolution ΔN becoming more than Nke, for example, when the engine revolution is lower than a standard idling revolution. As none of the conditions will be satisfied in the initial stage, the routine proceeds to step 105, and the duty D output this time is given as a value having deducted the second step duty Ds2=0.02% from the previous value. Eventually, at step 104, the condition of ΔN≧Nke or Nt≧Ntke is satisfied. Then the routine proceeds to step 106, and the duty D to be output is given as the connection completion duty Dc=0%, thereby ending the flow.

Each of the foregoing numerical values may be suitably changed. Moreover, the clutch does not have to be necessarily connected from a completely disconnected state, and the present invention may also be applied to this case.

Various other embodiments of the present invention may be considered. Although the wet friction clutch referred to in the present invention was a multiplate clutch in the foregoing embodiments, this may also be, for example, a single plate clutch. Further, although the fluid pressure referred to in the present invention was a hydraulic pressure, this may also be, for example, another fluid pressure such as pneumatic pressure. Although the transmission referred to in the present invention was a constantly engaged manual transmission in the foregoing embodiments, this may also be a constantly engaged automatic transmission, or a planetary gear automatic transmission as in an AT vehicle. The engine may also be diesel, gasoline, or other types.

According to the present invention as described above, a superior effect is yielded where the torque point may be suitably learned even in a wet multiplate clutch.

Moreover, according to the present invention as described above, a superior effect is yielded of being able to absorb the response delay during the clutch connection, accurately learn the true torque point during the torque point learning, and prevent a large clutch connection shock during an ordinary clutch connection control.

Further, according to the present invention as described above, a superior effect is yielded where redundancy can be maintained and the successful combination of the time lag and shock at the time of clutch connection can be sought even when the optimum starting duty value varies or deviates due to disturbances.

The present invention claims priority on Japanese Patent Application No. 2001-085303 filed on Mar. 23, 2001; Japanese Patent Application No. 2001-085304 filed on Mar. 23, 2001; and Japanese Patent Application 2001-093252 filed on Mar. 28, 2001 based on Article 119 of the U.S. Patent Law, wherein the contents thereof are fully incorporated herein.

What is claimed is:

1. A method of learning a torque point of a clutch in a power transmission device of a vehicle in which a wet friction clutch is provided in the middle of a power transmission path extending from the engine up to the transmission, so that the disconnection/connection state of the wet friction clutch is controlled in accordance with the duty ratio of the duty pulse output from an electronic control unit, wherein, when said electronic control unit is caused to learn a torque point at which a prescribed torque is transmitted initially while the wet friction clutch is being connected from the disconnected state thereof, the value of the duty ratio of the duty pulse output from said electronic control unit is learned as the torque points said torque point is learned to reduce connection time for said clutch.

2. The method of learning a torque point according to claim 1, wherein the starting condition of said torque point learning includes the conditions of a stopped vehicle, parking brake in use, foot brake in use, and transmission in use.

3. A method of learning a torque point of a clutch in a power transmission device of a vehicle in which a fluid coupling at the upstream side and a wet friction clutch at the downstream side are provided in series in the middle of a power transmission path extending from the engine up to the transmission; a hydraulic supplying device is provided for supplying a working fluid pressure to the wet friction clutch; and the hydraulic pressure supplied from said hydraulic supplying device is changed in accordance with the duty ratio of the duty pulse output from an electronic control unit, for thereby controlling the disconnection/connection state of the wet friction clutch, wherein, when said electronic control unit is caused to learn a torque point at which a prescribed torque is transmitted initially while the wet friction clutch is being connected from the disconnected state thereof, said duty ratio is changed, while detecting the revolution of the input side of said wet friction clutch and the revolution of said engine, for gradually connecting said wet friction clutch from the disconnected state thereof, and, when the revolution of the input side of said wet friction clutch becomes less than said engine revolution by a prescribed value of revolution during the foregoing process, the value of said duty ratio at this time is learned as the torque point.

4. The method of learning a torque point according to claim 3, wherein the starting condition of said torque point learning includes the conditions of a stopped vehicle, parking brake in use, foot brake in use, and transmission in use.

5. A method of learning a torque point of a clutch in a power transmission device of a vehicle in which a fluid coupling at the upstream side and a wet friction clutch at the downstream side are provided in series in the middle of a power transmission path extending from the engine up to the transmission; a hydraulic supplying device is provided for supplying a working fluid pressure to said wet friction clutch; and the hydraulic pressure supplied from said hydraulic supplying device is changed in accordance with the duty ratio of the duty pulse output from an electronic control unit, for thereby controlling the disconnection/connection state of said wet friction clutch, wherein, when said electronic control unit is caused to learn a torque point at which a prescribed torque is transmitted initially while said wet friction clutch is being connected from the disconnected state thereof, said duty ratio is changed, while detecting the revolution of said engine, for gradually connecting said wet friction clutch from the disconnected state thereof, and, when the revolution of the engine has dropped by a prescribed revolution during the foregoing process, the value of said duty ratio at this time is learned as the torque point.

6. The method of learning a torque point according to claim 5, wherein the starting condition of said torque point learning includes the conditions of a stopped vehicle, parking brake in use, foot brake in use, and transmission in use.

7. A method of learning a torque point of a clutch in a power transmission device of a vehicle in which a fluid coupling at the upstream side and a wet friction clutch at the downstream side are provided in series in the middle of a power transmission path extending from the engine up to the transmission; a hydraulic supplying device is provided for supplying a working fluid pressure to said wet friction clutch; and the hydraulic pressure supplied from said hydraulic supplying device is changed in accordance with the duty ratio of the duty pulse output from an electronic control unit, for thereby controlling the disconnection/connection state of said wet friction clutch, wherein, when said electronic control unit is caused to learn a torque point at which a prescribed torque is transmitted initially while said wet friction clutch is being connected from the disconnected state thereof, said duty ratio is changed, while detecting the revolution of the input side of said wet friction clutch and the revolution of said engine, for gradually connecting said wet friction clutch from the disconnected state thereof, and, when a difference between the revolution of the input side of said wet friction clutch and the revolution of said engine has become a value within a prescribed range of revolutions during the foregoing process, the value of said duty ratio at this time is learned as the torque point.

8. The method of learning a torque point according to claim 7, wherein the starting condition of said torque point learning includes the conditions of a stopped vehicle, parking brake in use, foot brake in use, and transmission in use.

9. A clutch control method for controlling the disconnection/connection of a clutch by altering the working fluid pressure for driving the disconnection/connection of a wet friction clutch in accordance with the duty pulse output from the electronic control unit, comprising the steps of:

outputting, from the electronic control unit, a prescribed start duty such that the clutch is initially connected broadly up to close to the torque point, when connecting the clutch from a disconnected state;

then outputting, from the electronic control unit in prescribed time intervals, such a prescribed gradual connection duty as to gradually connect the clutch;

retaining the start duty after said start duty is output; and commencing the output of said gradual connection duty after a predetermined time longer than said prescribed time elapses.

10. A method of learning a torque point of a clutch in a power transmission device of a vehicle in which a fluid coupling and a wet friction clutch are provided in series in the middle of a power transmission path extending from the engine up to the transmission, so that the disconnection/connection state of said clutch is controlled by changing the working fluid pressure for controlling the disconnection/connection of said clutch in accordance with the duty ratio of the duty pulse output from an electronic control unit, comprising the steps of:

- when said electronic control unit is caused to learn a torque point at which a prescribed torque is transmitted initially while said wet friction clutch is being connected from the disconnected state thereof, detecting the revolution of the input side of said clutch and the revolution of said engine, respectively;
- initially outputting, from the electronic control unit, a start duty such that the clutch is connected broadly up to a point close to the torque point;
- then outputting, from the electronic control unit, a prescribed gradual connection duty in prescribed time intervals such that the clutch is connected gradually;
- retaining the start duty after said start duty is output, and commencing the output of said gradual connection duty after a predetermined time longer than said prescribed time elapses; and
- when the revolution of the input side of said clutch becomes less than said engine revolution by a prescribed value of revolution during the foregoing process, learning the duty ratio at this time as the torque point.

11. The method of learning a torque point of a clutch according to claim 10, wherein said learning is conducted after a predetermined time that is longer than said prescribed time elapses from the time the decrease in said prescribed revolution is detected.

12. A clutch control method for controlling the disconnection/connection of a clutch by altering the working fluid pressure for driving the disconnection/connection of a wet friction clutch in accordance with the duty pulse output from the electronic control unit,

- wherein, when said clutch is connected from the disconnected state thereof, a start duty is first output from the electronic control unit, said start duty being predetermined such that the clutch is connected broadly up to a point dose to the torque point and the generation of excess clutch connection shock is constantly avoided in consideration of variances of the torque point;
- a first gradual connection duty is then output from the electronic control unit in prescribed time intervals so as to gradually connect the clutch; and
- a second gradual duty is output from the electronic control unit in prescribed time intervals such that the clutch is gradually connected slowly from the time a prescribed condition is satisfied.

13. The clutch control method according to claim 12, wherein said wet friction clutch is provided in series with a fluid coupling in the middle of a power transmission path extending from the engine up to the transmission in a vehicle, and said prescribed condition is established when the difference between the engine revolution and the clutch input side revolution exceeds a prescribed value.

* * * * *